US006293872B1

(12) United States Patent
Ganser

(10) Patent No.: US 6,293,872 B1
(45) Date of Patent: Sep. 25, 2001

(54) MOTOR VEHICLE STEERING SHAFT WITH TWO SHAFT SECTIONS

(75) Inventor: Martin Ganser, Weil der Stadt (DE)

(73) Assignee: Micro Compact Car AG, Biel (CH)

( * ) Notice: Subject to any disclaimer, the term of this patent is extended or adjusted under 35 U.S.C. 154(b) by 0 days.

(21) Appl. No.: 09/231,640

(22) Filed: Jan. 15, 1999

(30) Foreign Application Priority Data

Jan. 15, 1998 (DE) .............................................. 198 01 166

(51) Int. Cl.$^7$ ....................................................... F16C 3/03
(52) U.S. Cl. .......................... 464/167; 464/139; 464/183; 29/517
(58) Field of Search ..................... 464/139, 141, 464/142, 183, 167, 165; 29/894.1, 516, 517, 898.06, 898.03; 138/108, 112, 148; 74/492, 493

(56) References Cited

U.S. PATENT DOCUMENTS

| 3,600,970 | * | 8/1971 | Loofbourrow | 74/492 |
| 3,604,285 | * | 9/1971 | Olsson | 29/898.03 |
| 3,788,148 | * | 1/1974 | Connell et al. | 74/492 |
| 3,815,438 | | 6/1974 | Johnson . | |
| 4,509,386 | * | 4/1985 | Kimberlin | 29/898.03 |
| 5,797,696 | * | 8/1998 | Baynes et al. | 403/377 |
| 5,984,354 | * | 11/1999 | Kim | 280/777 |

FOREIGN PATENT DOCUMENTS

| 3513340 C2 | 10/1988 | (DE) . |
| 0 629 540 A1 | 12/1994 | (EP) . |
| 0 665 383 | 8/1995 | (EP) . |
| 48-30285 | 9/1973 | (JP) . |
| 50-57 | 6/1975 | (JP) . |
| 57-201761 | 12/1982 | (JP) . |
| 4-51866 | 4/1992 | (JP) . |

OTHER PUBLICATIONS

Office Action from the Japanese Patent Office dated Oct. 26, 1999.

* cited by examiner

Primary Examiner—Lynne H. Browne
Assistant Examiner—Aaron Dunwoody
(74) Attorney, Agent, or Firm—Crowell & Moring LLP

(57) ABSTRACT

The invention relates to a motor vehicle steering shaft with two shaft sections which are telescopically guided in one another and have corresponding profile cross-sections, between which at least one row of balls is fitted in. The row of balls are each arranged in the axial direction and are used as a driver element operating in the rotating direction. According to the invention, one axial stop respectively is assigned to the first and the last ball of the ball row. The stops are positioned on opposite shaft sections and at least one of these stops being plastically deformable.

15 Claims, 2 Drawing Sheets

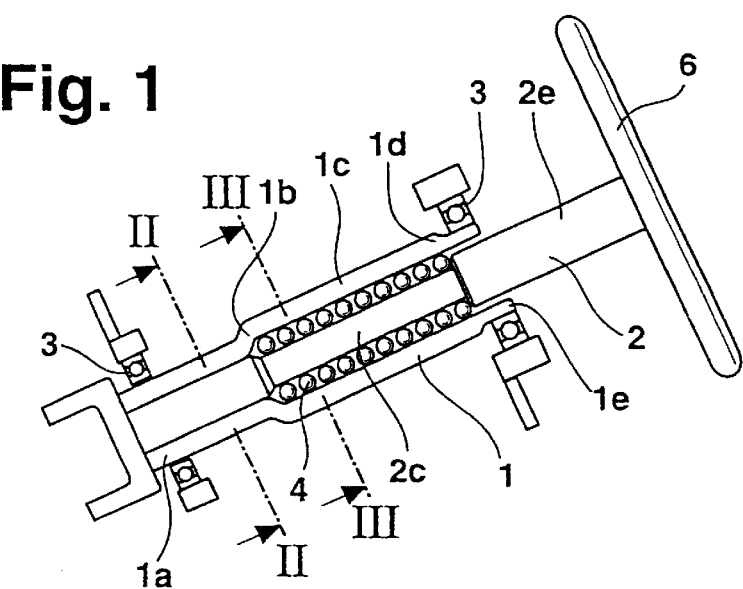
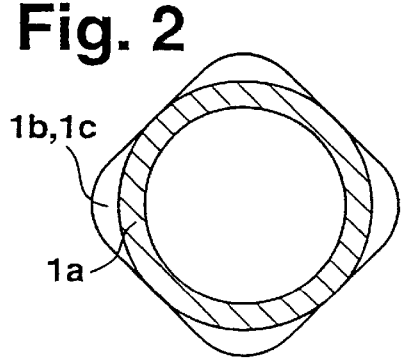
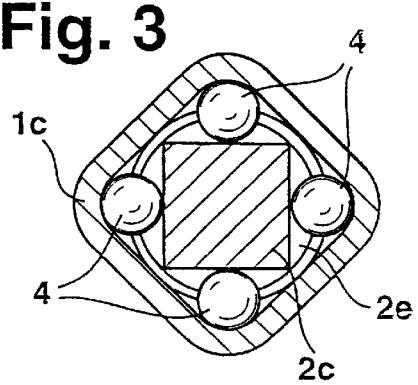
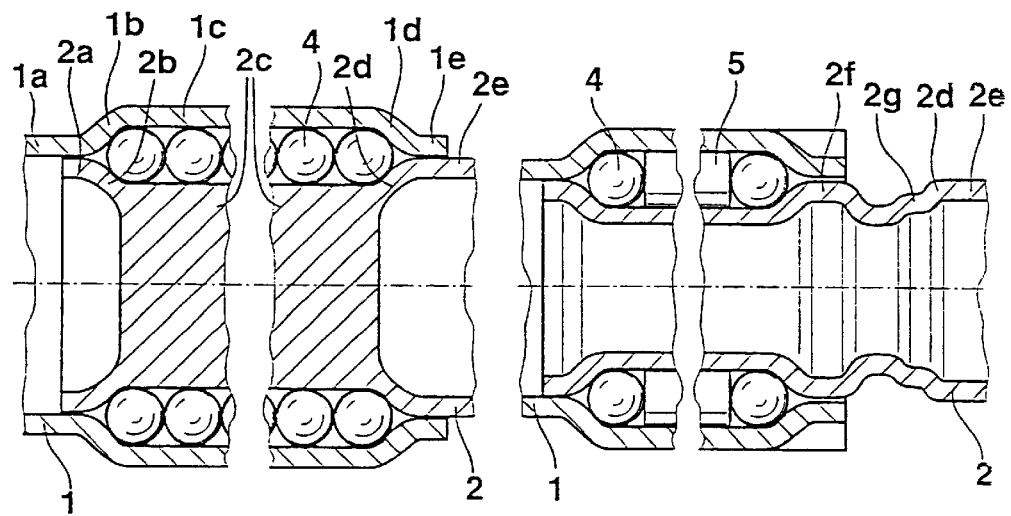

MOTOR VEHICLE STEERING SHAFT WITH TWO SHAFT SECTIONS

SUMMARY AND BACKGROUND OF THE INVENTION

This application claims the priority of German Patent Application No. 198 01 166.0-21, filed Jan. 15, 1998, the disclosure of which is expressly incorporated by reference herein.

The invention relates to a motor vehicle steering shaft having two shaft sections which are telescopically guided in one another. The shaft sections have corresponding profile cross-sections, between which at least one row of roller elements in each case arranged in the axial direction and is fitted in while creating a rotary fit between the profile cross-sections.

German Patent Document DE 35 13 340 C2 discloses, a driver connection between a hub and a shaft section guided therein, both of which having several longitudinal grooves, each corresponding in pairs and in which ball sets are arranged. A ball set consists of a row of balls which are arranged in the axial direction and which are pressed in between the hub and the shaft section into two corresponding longitudinal grooves forming a bearing seat, which is open in the axial direction, for the corresponding ball set. The pressing-in operation takes place while plastically deforming at least one of the components and establishes a connection which ensures a torque transmission and axial adjustability. A falling-out of the balls is to be avoided.

European Patent Document EP 0 629 540 B1 (corresponding to U.S. Pat. No. 5,544,542) discloses, a connection between two shaft sections of a motor vehicle steering column. A fixing of the shaft sections with respect to one another is provided by means of several form-locking cast resin packings and a square section which is form-lockingly guided in the rotating direction. A ball, which is fitted in during the manufacturing while a shaft section is plastically deformed is arranged between the shaft sections for ensuring electric contact. In the event of a crash, while the shaft sections are axially displaced with respect to one another, energy absorption is carried out by means of a further plastic deformation of a shaft section.

It is an object of the present invention to provide a motor vehicle steering shaft of the aforementioned type, wherein in addition to a torque transmission between the shaft sections, by means of particularly simple devices, a high occupant safety level is achieved in the event of a vehicle impact.

This and other objects are achieved in that an axial stop is assigned to the end-side roller elements of the roller element rows respectively. The axial stops are positioned on opposite shaft sections, at least one axial stop being plastically deformable. As a result, a form-locking fixing of the roller element rows is achieved in the axial and circumferential directions by means of a deforming of the at least one plastically deformable stop in the event of a crash-caused axial displacement. The movement energy is thereby destroyed. As a result of the arrangement of a suitable number of roller element rows, the connection can be adapted to possible cases of stress. In addition, by means of the special design of an individual stop, particularly by the dimensioning of the course which is radial relative to an axis of rotation of the steering shaft, the energy absorption capacity can be influenced.

As a further development of the invention, at least one axial stop is constructed as a transition from a circular to a noncircular profile cross-section of the concerned shaft section. Such a stop can be produced in a particularly simple manner.

In a further development of the invention, at least one axial stop has several steps of different courses in the radial direction which follow one another in the axial direction. As the result, a stepped deformation can be achieved of the shaft section having the stop as well as of the opposite shaft section because, when the pertaining balls roll over the stop, a deformation work is carried out which depends on the height of the radial expansion of the stop.

In a further development of the invention, a spacer, which is aligned in the axial direction of the shaft sections and is constructed as a separate structural element, is arranged between two balls of a roller element rows. The spacer does not have to be provided for a torque transmission between the shaft sections if the remaining balls are sufficient for the torque transmission. It is particularly useful for reducing the weight while ensuring a sufficient axial guiding of the shaft sections with respect to one another by the remaining balls which have a sufficient axial distance from one another.

In a further development of the invention, the spacer is constructed as a cylinder which has a diameter which corresponds at most to the diameter of the balls. Such a cylindrical spacer can also be used for the torque transmission. The cylinder may completely replace several balls.

Other objects, advantages and novel features of the present invention will become apparent from the following detailed description of the invention when considered in conjunction with the accompanying drawings.

BRIEF DESCRIPTION OF THE DRAWINGS

Additional advantages of the invention are found in the claims. The following description illustrates preferred embodiments of the invention by means of the drawings.

FIG. 1 is a schematic view of a motor vehicle steering shaft according to the invention;

FIG. 2 is a cross-sectional view of a first shaft section along the intersection Line II—II in FIG. 1;

FIG. 3 is a cross-sectional view of both shaft sections of the motor vehicle steering shaft along the intersection Line III—III in FIG. 1;

FIG. 4 is a representation of a detail of a longitudinal sectional view of the motor vehicle steering shaft according to FIG. 1 in the area of the ball rows;

FIG. 5 is a longitudinal sectional view analogous to FIG. 4 of a first modified embodiment of a motor vehicle steering shaft according to the invention;

DETAILED DESCRIPTION OF THE DRAWINGS

Figure 6:
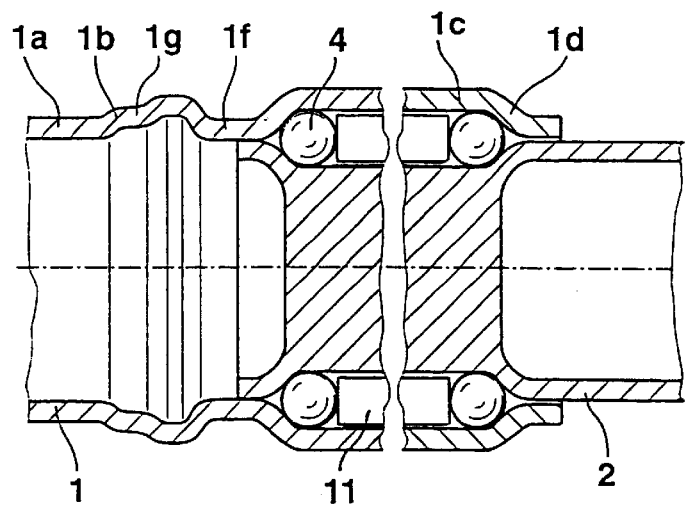
FIG. 6 is a longitudinal sectional view analogous to FIG. 4 of a second modified embodiment of a motor vehicle steering shaft according to the invention.

A steering shaft is illustrated in FIGS. 1 to 4 for a motor vehicle having a first shaft section 1 which has an essentially tube-shaped design and differently profiled areas 1a to 1e. By means of a driver arrangement 1c, 2c, 4 described below, a second shaft section 2 is telescopically and rotationally guided in the first shaft section 1. By means of a steering wheel 6 fixedly connected with the second shaft section 2, a steering gear, which is not shown, can be operated through an operative connection with the first shaft section 1. For this purpose, the first shaft section 1 is disposed so that it can be rotated about its axis by way of several ball bearings 3.

As illustrated in FIG. 2, the first shaft section has a first area 1a with an essentially circular cross-section. Adjoining a transition 1b, a second area 1c of the first shaft section 1 is provided. As illustrated in FIG. 3, section 1c has a noncircular cross-section and, by way of another transition 1d, changes into a third area 1e having a circular profile cross-section.

Like the first shaft section 1, the second shaft section 2 has areas 2a through 2e with a circular cross-section. Between areas 2a and 2e is area 2c of a square cross-section arranged by way of transitions 2b and 2d, as illustrated in FIGS. 3 and 4. In the overlapping area of the two shaft sections, the largest outside measurement of the second shaft section 2 is smaller than the clear inside diameter of the first shaft section. As illustrated in FIGS. 3 and 4, particularly the outside diameters of the areas 2a and 2e have a slightly smaller construction than the inside diameters of the corresponding areas 1a and 1e. In addition, the areas 1c and 2c have approximately the same axial dimensions relative to an axis of rotation of the steering shaft. As the result of different radial dimension and a corresponding arrangement of the two shaft sections aligned against one another, cage-type volumes are obtained between the areas 1c and 2c. The volumes are oblong in the axial direction. Several roller element rows in the form of ball rows 4 can be inserted therein without play.

Transitions 2b and 2d, which are assigned to ball rows 4 on the side of the second shaft section 2, bound the cage-type volumes in the axial direction and thus form axial stops for the ball rows 4. Correspondingly, transitions 1b and 1d on the side of the first shaft section 1 also form corresponding axial stops so that, when the ball rows 4 are inserted into the pertaining volumes, relative movement between the shaft sections is blocked.

The ball rows 4 are therefore used as driver elements which operate in the rotating direction of the steering shaft. Furthermore ball rows 4 fix the shaft sections guided in one another in the axial direction. Because of the design of the volumes for the ball rows 4 which is largely closed on all sides and permits a form-locking insertion, a secure bearing requires only a no-play insertion and no pressing-in of the balls 4.

In the above embodiment, the area 2c is constructed as a square piece whose diagonals are shorter than the edge lengths of the inside cross-section of the area 1c of the first shaft section 1. In addition, the length of the above-mentioned diagonal corresponds to the respective outside diameter of the areas 2a and 2e. The above-mentioned edge length of the area 1c corresponds to the respective inside diameter of the areas 1a and 1e. In this manner, stops are obtained directly from the transitions 1b, 1d, 2b, 2d between the noncircular and the circular cross-sections which act in the axial direction. The contact surfaces with the respective adjacent end-side balls of the ball rows may be constructed to be correspondingly rounded.

It should be understood that such a driver arrangement can be constructed with almost any arbitrary noncircular profile cross-section, the number of the required ball rows being correspondingly variable. It is also possible to omit one or two mutually opposite stops, such as the stops in the areas 2b and 1d. In such a case only one-sided axial fixing of the shaft sections would be ensured and possibly a pressing-in of one or several balls would be required.

According to a further aspect the invention, the axial stops 1b and 2d may be designed so that they can be plastically deformed in a targeted manner. In this case, it is possible that, in the event of a violent axial displacement of the second shaft section 2 with respect to the first shaft section 1, ball rows 4 may roll over them and deform the above-mentioned stops. The energy expenditures required in this case should be higher than a normal operating stress to the steering shaft. This should correspond to an impact energy of the vehicle occupants acting upon the steering shaft in the event of a crash of the vehicle. Parameters for adjusting the required deforming energy may include the variation of the number of used ball rows 4.

As illustrated in the embodiment according to FIG. 5, in which the same reference numbers as in the first embodiment are used for identical components, the further development of the plastically deformable axial stops may also determine the performance of the driver connection in the event of an effect of force onto the steering shaft. In this case, a spherical cap 2f is assigned to each ball row 4 in the area 2c of the second shaft section 2. This spherical cap 2f acts as a plastically deformable axial stop. Adjoining this axial stop at a short axial distance, transition 2d is provided which is also used as a stop and which, in this embodiment, is preceded by a step 2g. As a result, during a relative movement of the shaft sections with respect to one another, a resistance is at first obtained on the part of the connection arrangement which is higher than the normal operating stress and can be overcome only by an impact-caused stress. In this case, the balls roll along on the shaft sections and deform the spherical cap 2f. After the deformation of the spherical cap 2f, the resistance on the part of the connection arrangement decreases during a further displacement of the shaft sections with respect to one another. It is provided to correlate this reduction of resistance to an occurring deformation of other components, for example, of the steering column covering, so that the sum resistance of the whole steering column arrangement does not change considerably in this phase of the displacement. Finally, during a further displacement of the shaft sections, the balls 4 strike against the step 2g, their deformation resulting in an increase of the resistance which should be adapted to an impact stress by an occupant of an average weight ("50% dummy"). If the balls 4 finally reach the axial stop 2d, the resistance which the connection offers to a further relative movement must be designed for an impact stress by a very heavy occupant ("95% dummy") and therefore reach its maximum.

Furthermore, the embodiment illustrated in FIG. 5 has an additional modification in the form of several cylinders inserted between the shaft sections 1 and 2, in comparison to the embodiment illustrated in FIGS. 1 to 4. The cylinders 5 have a slightly smaller diameter than the balls 4. The cylinders 5 are aligned with their cylinder axes in parallel to the axis of rotation of the steering shaft and are arranged between the first and the last ball of each ball row. Such cylinders are easy to produce and carry out essentially the same torque transmitting function as the balls which they replace. This is the result of the fact that a deformation of the plastically deformable stops takes place by the first and the last balls of each ball row rolling between the two shaft sections. In the event of a violent relative movement between the shaft sections 1 and 2, the cylinders 5 can slide between the shaft sections.

In contrast to the above-mentioned embodiments, the embodiment illustrated in FIG. 6 exhibits modifications in the form of several parallelepiped-shaped spacers 11 inserted between the shaft sections 1 and 2 and a stepped construction of the outer first shaft section 1. The spacers 11 can be inserted between two arbitrary balls 4 of a ball row, whereby one or several balls may be eliminated. If the remaining balls are sufficient for a transmission of the operating torque between the shaft sections, the spacers do not have to be provided for torque transmission. They may therefore be made of a light material and permit a weight reduction of the driver connection. The stepped further development of the first shaft section 1 has, in each portion assigned to a ball row, a spherical cap 1f and a step 1g which are arranged between the transition 1b and the area 1c with the noncircular cross-section. It represents the counterpart to the stepped area 2f, 2g of the second shaft section 2 illustrated in FIG. 5 and can carry out the function explained in this respect.

Figure 7:
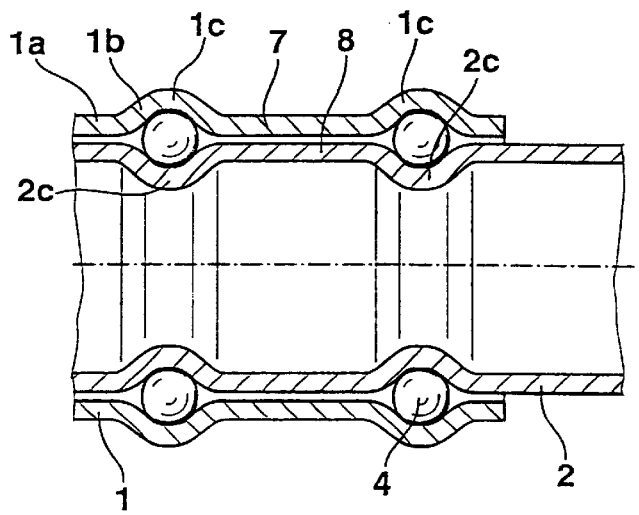
FIG. 7 is a longitudinal sectional view analogous to FIG. 4 of a third modified embodiment of a motor vehicle steering shaft according to the invention.

FIG. 7 shows a further embodiment, in which the same reference numbers as in the other embodiments are used for identical components. In this embodiment, the spacers 5, 11 constructed as separate structural elements are replaced by spacer sections 7 and 8 produced in one piece with the shaft sections 1 and 2. Since these spacer sections cannot be axially displaced with the balls, they preferably have a deformable construction so that the balls can roll over them. They are also not used for the torque transmission between the shaft sections 1, 2 and are therefore essentially similar to areas 1a and 1e as well as 2a and 2e, which is why they can also be designed with a round profile cross-section.

Figure 8:
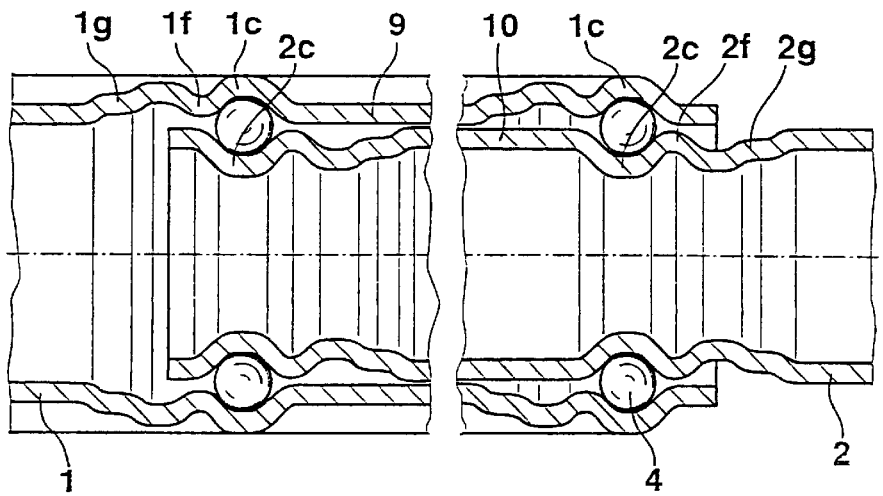
FIG. 8 is a longitudinal sectional view analogous to FIG. 4 of a fourth modified embodiment of a motor vehicle steering shaft according to the invention.

FIG. 8 illustrates a further embodiment which contains a combination of several characteristics of the previous embodiments. Thus, the first as well as the second shaft section each have a stepped area 1b, 1g and 2f, 2g which correspond to one another in their dimensions and which have the function described with respect to the second embodiment according to FIG. 5. Furthermore, deformable spacer sections 9 and 10 are provided as a further alternative and have a stepped construction similar to shaft sections 1 and 2, which further intensifies the described function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle steering shaft having two steering shaft sections telescopically guided in one another and having corresponding profile cross-sections, at least one row of roller elements arranged in an axial direction between the steering shafts providing a rotary fit and torque transmission between the profile cross-sections to facilitate transfer of rotational steering movement between the two shafts, at least one plastically deformable axial stop is provided at each end-side of the roller element row, the axial stops being formed by opposing inclined transition steps formed in each of the steering shaft sections.

2. Motor vehicle steering shaft according to claim 1, wherein the at least one axial stop is constructed as a transition area from a circular to a noncircular profile cross-section of the shaft section.

3. Motor vehicle steering shaft according to claim 1, wherein the at least one axial stop has a plurality of steps adjacent one another in the axial direction of each steering shaft section and each step has a different cross-section in a radial direction.

4. Motor vehicle steering shaft according to claim 1, wherein a spacer is aligned in the axial direction of the shaft sections and is constructed as a separate structural element arranged between two balls of the roller element row.

5. Motor vehicle steering shaft according to claim 4, wherein the spacer is constructed as a cylinder with a diameter being no larger than a diameter of the balls.

6. Motor vehicle steering shaft according to claim 1, wherein at least one deformable spacer is aligned in the axial direction of the shaft sections and is arranged between two balls of the roller element row and is in each case constructed in one piece with a shaft section.

7. Motor vehicle steering shaft according to claim 2, wherein the at least one axial stop has a plurality of steps adjacent one another in the axial direction and each step has a different cross-section in a radial direction.

8. Motor vehicle steering shaft according to claim 2, wherein a spacer is aligned in the axial direction of the shaft sections and is constructed as a separate structural element arranged between two balls of the roller element row.

9. Motor vehicle steering shaft according to claim 3, wherein a spacer is aligned in the axial direction of the shaft sections and is constructed as a separate structural element arranged between two balls of the roller element row.

10. Motor vehicle steering shaft according to claim 2, wherein at least one deformable spacer is aligned in the axial direction of the shaft sections, and is arranged between two balls of the roller element row and is in each case constructed in one piece with a shaft section.

11. Motor vehicle steering shaft according to claim 3, wherein at least one deformable spacer is aligned in the axial direction of the shaft sections, and is arranged between two balls of the roller element row and is in each case constructed in one piece with a shaft section.

12. Motor vehicle steering shaft according to claim 4, wherein at least one deformable spacer is aligned in the axial direction of the shaft sections, and is arranged between two balls of the roller element row and is in each case constructed in one piece with a shaft section.

13. Motor vehicle steering shaft according to claim 5, wherein at least one deformable spacer is aligned in the axial direction of the shaft sections, and is arranged between two balls of the roller element row and is in each case constructed in one piece with a shaft section.

14. A steering shaft for a motor vehicle comprising:

a first steering shaft having a first cross-sectional profile;

a second steering shaft having a second cross-sectional profile corresponding to the first cross-sectional profile; the second steering shaft being telescopically and rotatably disposed in the first steering shaft and the first and second steering shaft being arranged to transfer a rotational steering movement therebetween;

at least one row of roller elements arranged in an axial direction between the first and second steering shafts; and at least one plastically deformable axial stop formed at an end of the first and second steering shafts, the axial stops being formed by opposing inclined transition steps formed in adjacent end portions of the first and second shafts.

15. A method for forming a shock absorbing steering shaft for a motor vehicle comprising the steps of:

forming a first steering shaft with a first cross-sectional profile;

positioning a second steering shaft having a second cross-sectional profile within the first steering shaft and the first and second steering shaft being arranged to transfer a rotational steering movement therebetween;

arranging at least one row of roller elements axially between the first shaft and the second steering shaft;

forming at least one plastically deformable axial stop at each end of the first and second shafts, the axial stop being formed by opposing inclined transition steps formed in adjacent end portions of the first and second shafts, the axial stop being positioned so that when a predetermined stress is placed on the shaft, the rolling elements will plastically deform the axial stop thereby absorbing the stress.

* * * * *